Patented Sept. 26, 1939

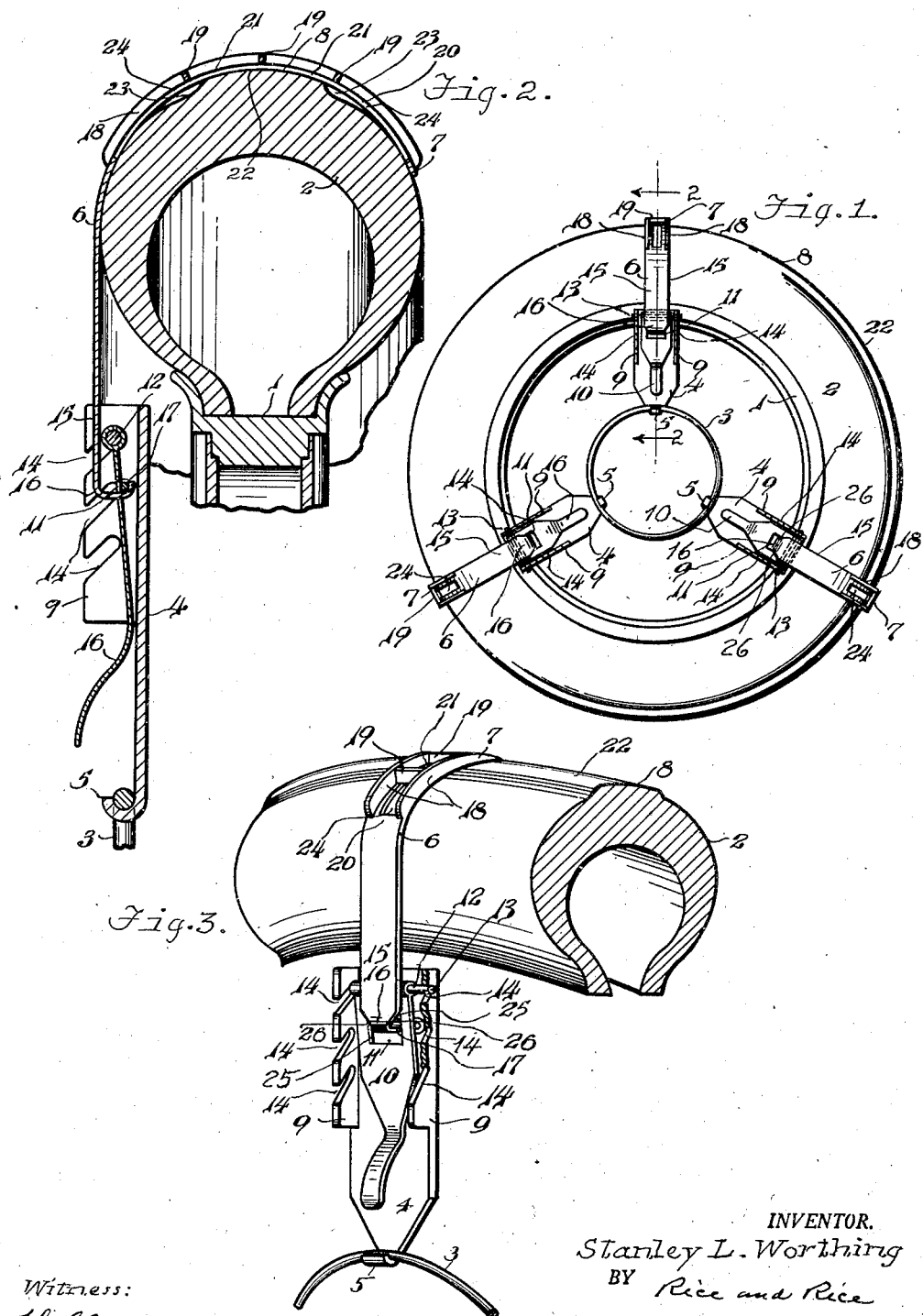

2,174,345

UNITED STATES PATENT OFFICE 2,174,345

TRACTION DEVICE FOR VEHICLE WHEELS

Stanley L. Worthing, Spring Lake, Mich.

Application April 4, 1938, Serial No. 199,877

1 Claim. (Cl. 152—213)

The present invention relates to traction devices for vehicle wheels; and its object is to provide an improved device of this character which shall be simple and economical in construction, effective in operation and which may be readily applied and adjusted to a vehicle wheel and as readily removed therefrom.

This and any other and more specific objects hereinafter appearing are attained by, and the invention finds preferable embodiment in, the illustrative structure particularly described in the body of this specification and illustrated by the accompanying drawings, in which—

Figure 1 is an outer side view of my traction device shown applied to an automobile's wheel;

Figure 2 is a sectional view (enlarged) of a portion thereof, taken on the radial line 2—2 of Figure 1;

Figure 3 is a view in perspective of a portion of the same, certain parts being broken away.

In these views my traction device is illustrated as applied to the wheel of an automobile having the rim 1 and pneumatic tire 2. The device, as thus illustrated, comprises a central ring 3, a plurality (three being shown) of inner members 4 having hooked inner ends 5 detachably receiving the ring along which they may be slid to adjusted angularly spaced positions, in this case to positions spaced 120 degrees apart, the device comprising also outer members 6 corresponding in number and angular position with the inner members 4, and comprising also means for adjustably connecting the members 4 and 6 as cooperating pairs.

The outer members having hooked outer ends 7 extending transversely over the curved outer side or tread 8 of the tire, the inner surface of these outer ends being concave to conform with the curvature of the tread. The means shown for connecting these inner and outer members 4, 6 of each pair comprises parallelly spaced radially extending flanges 9 formed on the outer face of the inner member 4, the operating lever 10 having an opening 11 therethrough and a pivot pin 12 whose opposite ends 13 extend from the edges of the lever far enough to removably seat turnably in a pair of notches 14 in said flanges, said means comprising also the inner end portion 15 of the outer member 6 which is bent at 16 to extend through the opening 11 and has on its free end, behind the lever 4, the operating lever 17 extending from its edges far enough to be engaged by the rear side of the lever and thereby held by the lever in its rearwardly turned operative position best shown in Figures 1 and 3.

The edges 25 of the lever at the opposite sides of the opening 11 extend into recesses 26 in the corresponding edges of the outer member's said inner end portion 15 to limit the lever's turning movement relatively to said inner end portion 15.

The device may be applied to wheels of different diameters by inserting the pivot pin 12 in the appropriate pair of notches 14, and as these notches extend toward the wheel and towards its rim, the turning of the lever to the operative position shown in the views tensions the device throughout to clamp said outer members 6 on the tire.

It will be seen that the following results are accomplished by this simple device: Any number of pairs of inner and outer members 4, 6 with their connecting means may be used as desired or found advisable in particular cases, three such pairs with their connecting means being shown in the views; these pairs may be spaced at desired angular distances apart, the hooked inner ends of the inner members 4 being slidable along the ring; the device is very readily applied at any time to the wheel, as by first positioning one of the pairs at the upper side of the wheel (Figure 1), which will thus hold the ring depending therefrom against falling, whereupon other pairs, as may be desired, may be applied at desired angular distances apart; the inner and outer members of each pair may be adjusted in relative position independently of the other pairs to accommodate peculiar or different conditions in different angular portions of the tire, etc.; and when the device is applied, it is tensioned throughout and all its parts are supported by the tire only, so that when the device is applied to a pneumatic tire the air pressure therein acting with substantial uniformity throughout the tire's extent serves to maintain the clamping of the device thereon in substantially a uniform degree through the tire's extent.

As illustrated, the hooked outer ends 7 of the outer members 6 have spaced ribs 18 extending transversely of the tire to add to the tractional effect of the wheel and spaced ribs 19 extending in the wheel's circumferential direction to prevent sidewise or "skidding" movement; and the base 20 of these outer ends 7 has openings 21 therethrough between the ribs and is spaced, as by the ridge 22 of the tire, from the surface of the main part of the tire thus providing depressions or channels 23 therein, so that ice or dirt entering the spaces between the ribs may pass through said openings 21 and through like openings 24 and be discharged from under said hooked outer ends 7.

The invention being intended to be pointed out in the claim, is not to be limited to or by details of construction and arrangement of the particular embodiment thereof illustrated by the drawing or hereinbefore described.

I claim:

A traction device of the class described for vehicle wheels, comprising: a ring; a plurality of angularly adjustable spaced inner members having hooked inner ends detachably receiving the ring slidably therein and having a pair of radially extending flanges with notches therein; a plurality of outer members angularly spaced correspondingly with said inner members, having hooked outer ends extending over the tread of the tire of the wheel and inner end portions with recesses in their opposite edges, the free ends of said portions extending through the hereinafter mentioned openings and having cross bars at their free ends behind the hereinafter mentioned levers; levers having openings therethrough and extending at the opposite sides of the openings into the recesses, and having pivot pins removably seating turnably in corresponding pairs of the notches, the levers when turned rearwardly engaging at their rear sides the cross bars to hold said members in operative position.

STANLEY L. WORTHING.